United States Patent [19]

Ono

[11] 4,130,222
[45] Dec. 19, 1978

[54] FLUID RESERVOIR

[75] Inventor: Takayoshi Ono, Toyota, Japan

[73] Assignee: Toyota Jidosha Kogyo Kabushiki Kaisha, Toyota, Japan

[21] Appl. No.: 773,937

[22] Filed: Mar. 3, 1977

Related U.S. Application Data

[63] Continuation-in-part of Ser. No. 663,344, Mar. 3, 1976, abandoned.

[30] Foreign Application Priority Data

Mar. 14, 1975 [JP] Japan .................. 50-35073[U]

[51] Int. Cl.² ................................... B65D 51/16
[52] U.S. Cl. ................................ 220/373; 220/303
[58] Field of Search .......... 220/303, 304, 295, 361, 220/367, 373, 374, 378, 369, 373, 303; 303/80, 85

[56] References Cited

U.S. PATENT DOCUMENTS

| | | | |
|---|---|---|---|
| 2,366,428 | 1/1945 | Scott | 220/371 X |
| 2,602,565 | 7/1952 | Regan | 220/304 X |
| 2,722,338 | 11/1955 | Eshbaugh | 220/295 |
| 3,173,265 | 3/1965 | Bixby | 220/367 X |
| 3,298,794 | 1/1967 | Mikesell, Jr. et al. | 220/378 X |
| 3,317,079 | 5/1967 | Ferrell et al. | 220/367 X |
| 3,516,569 | 6/1970 | Goes | 220/293 |
| 3,961,724 | 6/1976 | Kapsy | 220/371 |

Primary Examiner—William Price
Assistant Examiner—Steven M. Pollard
Attorney, Agent, or Firm—Stevens, Davis, Miller & Mosher

[57] ABSTRACT

A fluid reservoir, especially used in brake or clutch master cylinders of motor vehicles, comprises a fluid reservoir body made from a resin material, a resin cap attached to an inlet opening portion of said body, a rubber sealing member interposed between an inside face of said cap and said inlet opening portion of the body, and a spacer means made from a material other than rubber and disposed between said inside face of the cap and said sealing member so that it does not solidly adhere therebetween.

6 Claims, 7 Drawing Figures

FLUID RESERVOIR

This application is a continuation-in-part of application Ser. No. 663,344, filed Mar. 3, 1976, now abandoned.

This invention generally relates to fluid reservoirs and more particularly to fluid reservoirs used in brake or clutch master cylinders of motor vehicles.

It is generally well known to those skilled in the art that it can be difficult to remove a resin cap from a fluid reservoir made from a resin material because of solid adhesion between the cap and a rubber sealing member which is interposed between said cap and a reservoir body. Such solid adhesion frequently occurs, when the fluid reservoir is left alone for a long time after the cap is fastened to the reservoir body without wiping away spilled liquid left on a sealing face of the rubber sealing member. Moreover, in order to maintain the sealing tightness of the brake or clutch fluid in the reservoir, the sealing member must be made of rubber.

Accordingly, it is the principal object of the present invention to provide a new and improved fluid reservoir in which the resin cap does not solidly adhere to a sealing member and can be easily removed from a reservoir body.

Another object of the present invention is to provide a fluid reservoir in which leakage of fluid and the entrance of water or dust into the reservoir can be effectively prevented.

These objects of the present invention will be readily evident from the following specification together with the accompanying drawings wherein.

Figure 1:
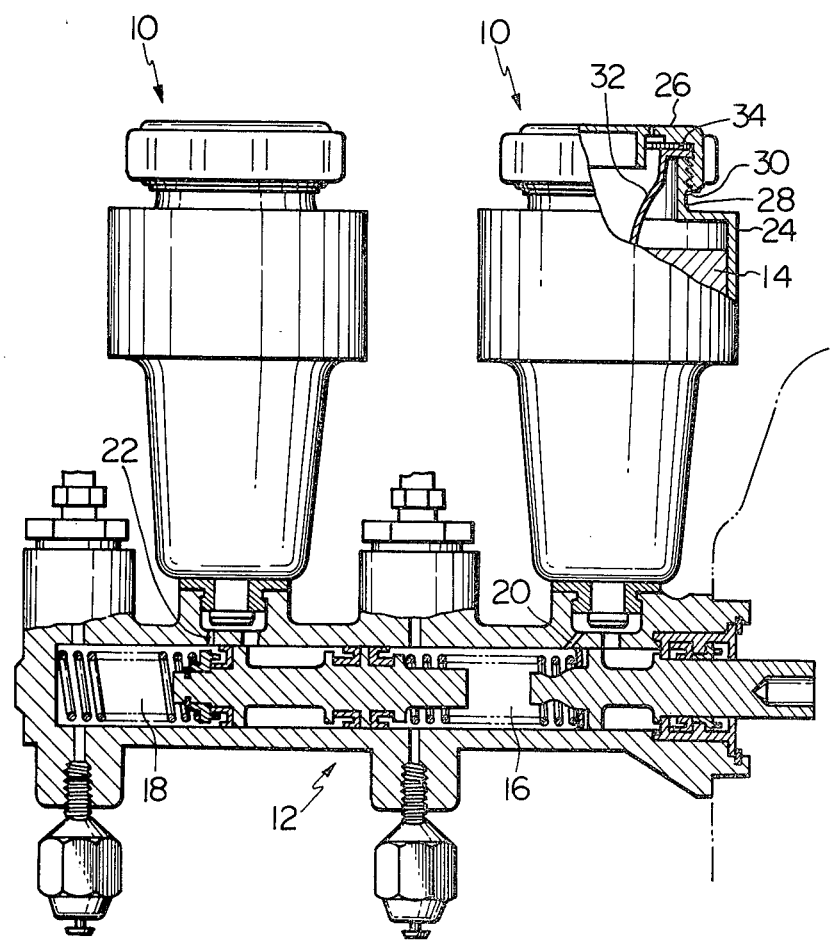
FIG. 1 is a side elevational view of two fluid reservoirs mounted on a tandem brake master cylinder, partially illustrated in cross section.

Referring now to the drawings, FIG. 1 illustrates two fluid reservoirs, generally indicated by reference numeral 10, which are mounted on a tandem or split type brake master cylinder 12 for a motor vehicle. These fluid reservoirs 10 are filled with hydraulic fluid 14, which is supplied into hydraulic chambers 16 and 18 through compensating ports 20 and 22, respectively.

Since the tandem or split type brake master cylinder 12 is well-known to those skilled in the art, and does not consists of any portions of the present invention, the detailed explanation of the constructions and operations thereof is not necessary.

Figure 2:
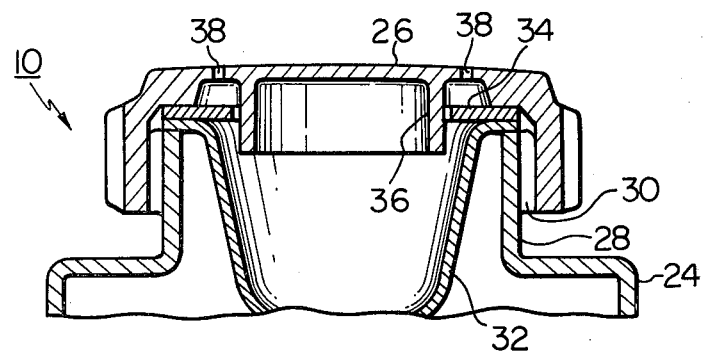
FIG. 2 is an enlarged cross sectional view of a head portion of one of the fluid reservoirs shown in FIG. 1.

The fluid reservoir 10, as illustrated in FIG. 2 also, includes a reservoir body 24, which is made from a resin material, such as nylons, polyethylenes or polyplopylenes, a cap 26, which is also made from a resin material, such as nylons, polyethylenes or polyplopylenes and is attached to an inlet opening portion 28 of the body 24 by a thread engagement 30 and a rubber sealing member 32, which is interposed between an upper face of said inlet opening portion 28 and an inside face of the cap 26.

The fluid reservoir 10 according to the present invention further includes an annular spacer member 34 which is disposed between said inside face of the cap 26 and said rubber sealing member 32. The annular spacer member 34 can be made from any suitable material other than rubber, such as for example metals or resins like polyethylenes or nylons. The spacer member 34 serves to prevent solid adhesion between the inside face of the cap 26 and the rubber sealing member 32.

Even if the resin cap 26 is tightly fastened to the opening portion 28 of the reservoir body 24 and the reservoir 10 is left alone for a long time, said cap 26 can be easily removed from the reservoir body 24 without using any special tools.

The annular spacer member 34 has an inner diameter slightly larger than the outer diameter of an annular sleeve 36 which extends from the inside face of the cap 26. The spacer member 34 and the annular sleeve 36 cooperate and define a deflector means therebetween. The deflector means acts to prevent fluid leakage and the entrance of water or dust through air breathing ports 38, which are formed in the cap 26 between the sleeve 36 and the abutting portion between the annular spacer member 34 and the inside face of the cap 26.

Figure 3:
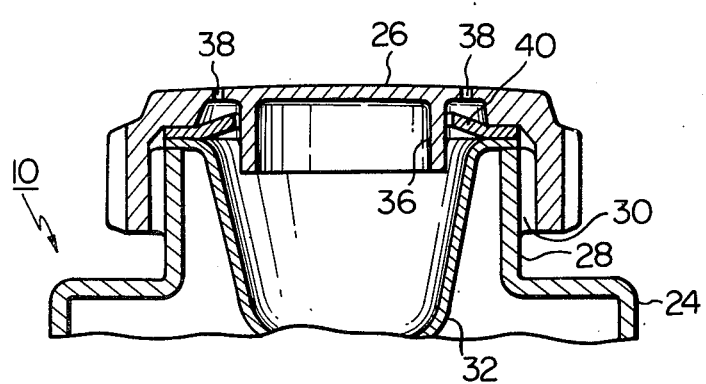
FIG. 3 is a partial cross sectional view of a modified form of said fluid reservoir.

In a modified form of this invention illustrated in FIG. 3, almost all parts of the reservoir 10 are identical to those of the reservoir shown in FIG. 2, except for the shape of an annular spacer member 40, which has its inner peripheral portion tapered toward the inside face of the cap 26. On the annular spacer member 40 water drops, which enter the reservoir 10 through the air breathing ports 38, are collected and flow out through a microscopic gap defined between the cap 26 and the spacer member 40 and through back-lashes of the thread engagement portion 30.

Figure 4:
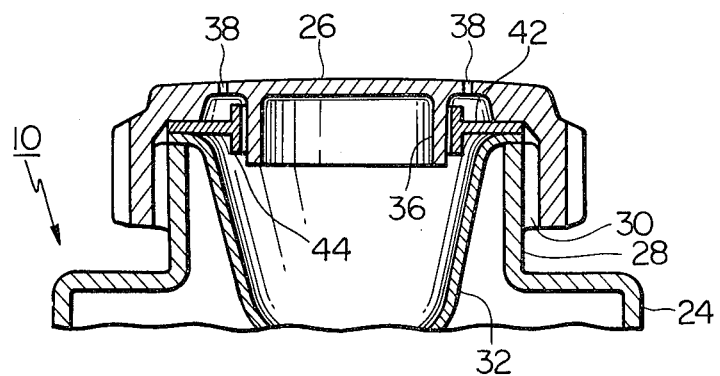
FIG. 4 is a partial cross sectional view of another modified form of the fluid reservoir.

In FIG. 4, another annular spacer member 42 is shown, which has an annular step 44 extending vertically from its inner peripheral end.

Figure 5:
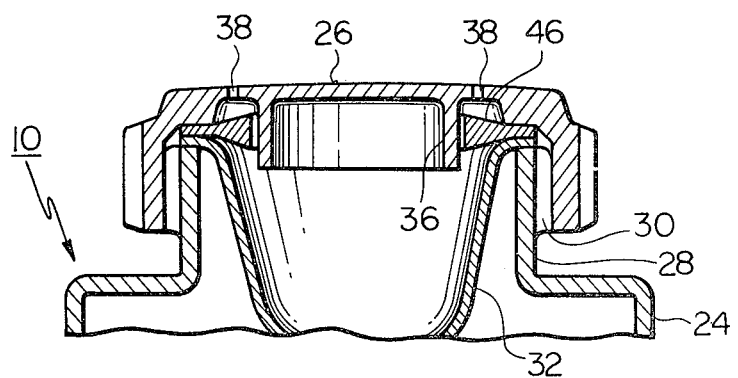
FIG. 5 is a partial cross sectional view of a further modified form of the fluid reservoir.

In FIG. 5, a further annular spacer member 46, is shown, which has a shape such that the inner peripheral portion thereof grows larger step by step in thickness.

The annular spacer rings 42 and 46 shown in FIGS. 4 and 5 can be attached to the reservoirs 10 easily because of their symmetrical configurations.

Figure 6:
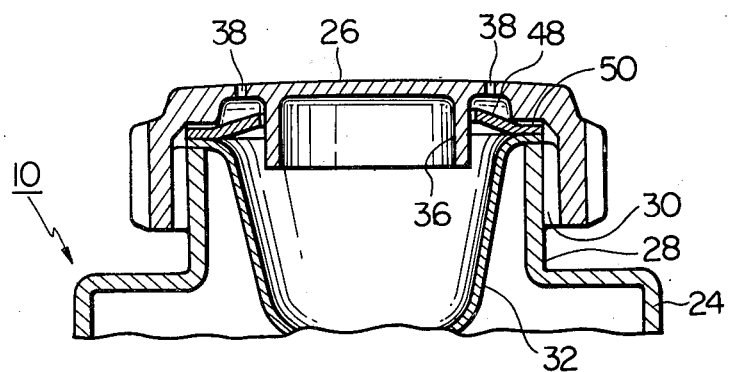
FIG. 6 is a partial cross sectional view of a still further modified form of the fluid reservoir.
Figure 7:
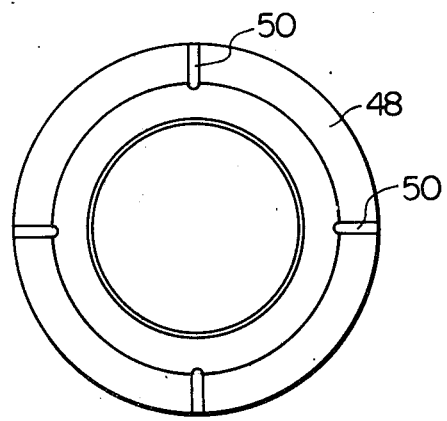
FIG. 7 is a plan view of a ring spacer member used in the modified form shown in FIG. 6.

In FIGS. 6 and 7, a still further annular spacer member 48 is shown, which is similar to that in FIG. 3, except that four grooves 50 formed on the upper surface thereof, which surface abutts against the inside face of the cap 26, are provided. Water drops collected on the annular spacer member 48 are guided into the grooves 50 and flow out through the back-lashes of the thread engagement portion 30.

What I claim is:

1. A fluid reservoir used in brake or clutch master cylinders of motor vehicles comprising:
    a fluid reservoir body made from a resin material;
    a cap made from a resin material and attached to an inlet opening portion of said reservoir body by a thread engagement;
    a rubber sealing member interposed between an inside face of said cap and an end face of said inlet opening portion of the reservoir body, and;
    a spacer means made from a material other than rubber, such as metals or resins for example, and disposed between said inside face of the cap and said sealing member so that it does not solidly adhere therebetween;

wherein said cap has an annular sleeve extending from the inside face of the cap and at least one air breathing port, which is formed in said cap between said sleeve and the abutting portion between said spacer means and said inside face of the cap.

2. A fluid reservoir as set forth in claim 1, wherein said spacer means comprises an annular spacer member, which has an inner diameter slightly larger than the outer diameter of said annular sleeve of the cap and which cooperates with said annular sleeve to define a deflector means.

3. A fluid reservoir as set forth in claim 2, wherein the inner peripheral portion of said annular spacer member is tapered toward the inside face of the cap.

4. A fluid reservoir as set forth in claim 2, wherein said annular spacer member has an annular step extending in a direction perpendicular to said annular spacer member from its inner peripheral end.

5. A fluid reservoir as set forth in claim 2, wherein said annular spacer member has such a shape that the inner peripheral portion thereof grows larger step by step in thickness.

6. A fluid reservoir as set forth in claim 2, wherein said annular spacer member has at least one groove formed on the upper surface thereof which abutts against the inside face of the cap.

* * * * *

UNITED STATES PATENT AND TRADEMARK OFFICE
CERTIFICATE OF CORRECTION

PATENT NO. : 4,130,222
DATED : December 19, 1978
INVENTOR(S) : Takayoshi ONO

It is certified that error appears in the above-identified patent and that said Letters Patent are hereby corrected as shown below:

On the first page, left column, line 9,
change "abandoned" to --U. S. Patent No. 4,106,666, August 15, 1978--;

Column 1, lines 5 and 6, change "now abandoned" to --U. S. Patent No. 4,106,666, August 15, 1978--.

Signed and Sealed this

Fifth Day of June 1979

[SEAL]

Attest:

RUTH C. MASON
*Attesting Officer*

DONALD W. BANNER
*Commissioner of Patents and Trademarks*